(No Model.)
A. H. READ.
NUT LOCK.
No. 510,708. Patented Dec. 12, 1893.
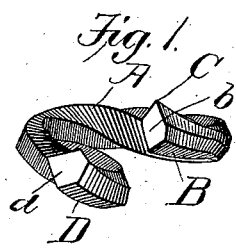
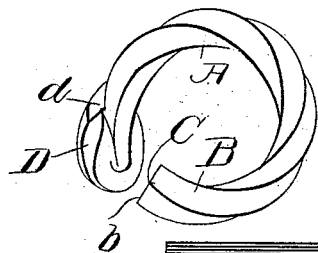
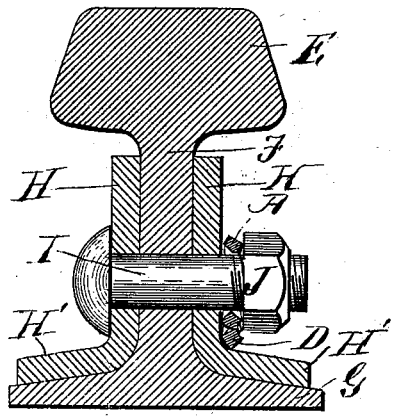
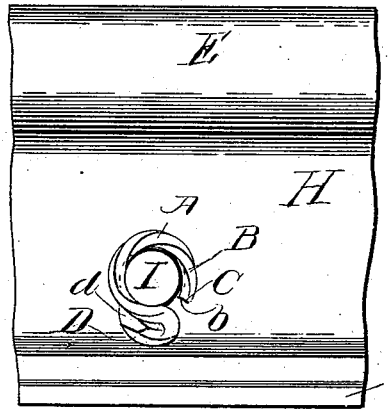
Witnesses
J. R. Cornwall
A. Ramel
Inventor
Alfred H. Read
By Paul Bakewell
his atty.

UNITED STATES PATENT OFFICE.

ALFRED H. READ, OF ST. LOUIS, MISSOURI, ASSIGNOR TO THE AMERICAN NUT-LOCK COMPANY, OF SAME PLACE.

NUT-LOCK.

SPECIFICATION forming part of Letters Patent No. 510,708, dated December 12, 1893.

Application filed April 1, 1893. Serial No. 468,682. (No model.)

*To all whom it may concern:*

Be it known that I, ALFRED H. READ, a citizen of the United States, residing at St. Louis, in the State of Missouri, have invented certain new and useful Improvements in Nut-Locks, of which the following is a full, clear, and exact description.

My invention relates to a nut lock for which a patent was granted to George H. Moore on November 8, 1881, No. 249,383, and has for its object such improvements in and to the nut lock the subject of the aforementioned patent as to adapt it to practical application and to overcome certain objectionable features found therein, when the same is used in practice.

In the fishplates used to join the ends of the rails in railroad work—the class of work in which nut locks are most extensively used—the hole through which the securing bolt is passed is elongated, or elliptical, to compensate for the changes in length of the rails due to changes of temperature.

When the nut lock, or washer, is made as an open ring, with the ends sprung from the plane of the ring, it has been found that the projecting or biting end next to the fish plate, when the ring is used as a nut lock, is liable to enter one end of the elongated, or elliptical, bolt hole in the fish plate, and thereby be prevented from freely turning with the nut, when the same is screwed home, at the same time to a greater or less degree preventing the sprung ends of the ring from having a full, efficient action as a nut lock.

In the accompanying drawings, which serve to illustrate my invention, and in which like characters of reference denote like parts in the several figures,—Figure 1 is a side elevational view of my improved nut-lock. Fig. 2 is a plan view of the same. Fig. 3 is a sectional view of a railroad rail, taken through one of the boltholes in the fish plate, and is illustrative of the application of my improved nut lock; and Fig. 4 is a side elevation of what is shown in Fig. 3, with the nut removed.

The nut lock, as a whole, consists essentially, as in the old device, in an open ring, bent in shape from a twisted rod or bar of hardened steel, polygonal in cross section; and as now improved, the present form has one end of this ring cut on a bevel to form a cutting or biting corner, while the other end portion, is provided with a projecting lug or extension, which is preferably formed by bending or doubling the end back on the body-portion, externally. These ends are also sprung in opposite directions from the plane of the body-portion of the ring.

A represents the open ring, as a whole; B, one end which is beveled off, as at *b*, forming the cutting corner C; D, the other end portion, which, as shown in Figs. 2 and 4, is bent or doubled back on the ring proper forming an extending lug portion projecting from the body of the ring proper at this point in the circumference of the same; each of which ends are bent or sprung in opposite directions from the plane of the body-portion of the ring; *d*, the extreme end of the doubled back portion which is preferably beveled off corresponding to a tangent to the ring at its point of contact; E, F, and G, the tread, web, and foot flange, respectively, of the rail; H, the fish-plates or tie bars; I, the fish plate bolt; and J, the nut.

The essential feature of the lug or bent portion D is to form the ring, as a whole, for the purposes of a nut lock, with a lug or projection that will extend sufficiently far radially from the axis of the bolt, to, in all possible positions of the bolt in the elongated bolt hole in the fish plate I, prevent that end of the sprung ring from entering the end of the bolt hole. The essential functional feature of this is to permit the nut lock to turn freely with the nut, after the nut has been screwed on the bolt far enough to take hold of the sprung end of the same, until the nut has been firmly seated or screwed home, when the cutting edges of the twist in the ring will be more or less embedded in the material of the fish plate and the cutting corner C (which should, evidently, be placed toward the nut J when the lock is applied) allowed to form for itself a seating depression in the rear side face of the nut and not be forced to cut or rout out a substantially concentric groove in the face of the nut, along which the cutting corner C could more easily return, rendering the loosening of the nut more easy.

To effect the desired function of the radially extending lug, formed by the doubled back portion D, as described, it is obvious that the doubled back portion when formed in the manner illustrated, should be bent back in the plane of that end of the ring, so that the bearing of the sprung ends remains substantially at the ends of the open ring in the same manner as if this lug portion (D) were not present. There is another feature that renders this, to say the least, desirable, independent of the objection to this end entering the elongated bolt hole, and that is, when the nut is unscrewed, as is often necessary, the strain on the nut lock will be concentric with the bolt and removed as short a distance as possible, radially, from the axis of the bolt, in this manner reducing to a decided degree the likelihood of destroying the nut lock when the nut is removed for repair purposes, and yet not in the least deteriorating from the efficient action of the open ring as a nut lock.

In instances where the fish plates H used are formed as angle bars with a horizontal member H′ (see Fig. 3), to match the angle in the rail between the web F and foot flange G, there is hardly room for the doubled portion D of the nut lock to pass between the lower side of the bolt I and the upper surface of the horizontal member H′ of the fish plate, as is evidenced by Figs. 3 and 4. This means that, in screwing the nut J home, the nut lock A can be turned to a position that it will be prevented from turning with the nut. For this reason, as already described, I bevel off this doubled back portion D on a line corresponding to a tangent to the ring, thereby forming the projecting lug wedge-shaped, so that when the nut lock is turned, in the screwing home of the nut, to the position shown in Fig. 4, the lug portion D, bearing against the upper surface of the member H′ of the fish plate, will act to force the bolt I up strongly against the upper side of the bolt hole in the fish plate, the bearing of the lug D against the member H′ of the fish plate being in a vertical line immediately below the axis of the bolt I. In this manner the bolt I, the fish plate H, and the nut lock A are bound together practically as one piece and move together vertically when subjected to the constant jarring of passing trains, there being thereby no tendency in this vertical jarring to rotate the nut lock and loosen the nut. This is a feature evidently of decided advantage over forms of nut locks where the inner sprung end of the nut lock is formed, to prevent its entering the elongated bolt hole in the fish plate with a tangentially extending end member, which under the circumstances just described would act as a lever to unloosen the nut when subjected to this constantly occurring vertical play, always more or less present in these devices.

Having thus described my invention and its method of operation, what I claim, and desire to secure by Letters Patent, is—

1. The herein-described nut lock, consisting in an open ring with its ends sprung in opposite directions from the plane of the ring, one of said ends being bent or doubled back on itself exteriorly to the ring, and substantially concentrically relative thereto substantially as and for the purposes specified.

2. The herein-described nut lock, consisting in an open ring formed from twisted material polygonal in cross-section and with its ends sprung in opposite directions from the plane of the ring, one of said ends being formed with a lug, or projection on its outer circumferential face substantially as and for the purposes specified.

3. The herein-described nut lock, consisting in an open ring formed from material polygonal in cross-section and with its ends sprung in opposite directions from the plane of the ring, one of said ends being cut on a bevel, thereby forming a cutting corner, and the other end being bent or doubled back substantially concentrically on itself, forming a radially extending lug, substantially as and for the purposes specified.

4. The herein-described nut lock, consisting in an open ring formed from twisted material polygonal in cross-section, and having its ends sprung in opposite directions from the plane of the ring, one of said ends being bent or doubled back substantially concentrically on itself exteriorly, substantially as and for the purposes described.

In testimony whereof I hereunto affix my signature, in presence of two witnesses, this 14th day of March, 1893.

ALFRED H. READ.

Witnesses:
A. RAMES,
HUGH K. WAGNER.